(12) United States Patent
Servin

(10) Patent No.: US 8,622,086 B2
(45) Date of Patent: Jan. 7, 2014

(54) MULTI-POSITION MICRO-FLUIDIC VALVE SYSTEM

(75) Inventor: Carl M. Servin, Rohnert Park, CA (US)

(73) Assignee: Idex Health & Science LLC, Northbrook, IL (US)

(*) Notice: Subject to any disclaimer, the term of this patent is extended or adjusted under 35 U.S.C. 154(b) by 313 days.

(21) Appl. No.: 13/035,682

(22) Filed: Feb. 25, 2011

(65) Prior Publication Data

US 2011/0203678 A1    Aug. 25, 2011

Related U.S. Application Data

(60) Provisional application No. 61/308,232, filed on Feb. 25, 2010.

(51) Int. Cl.
*F16K 11/06* (2006.01)
(52) U.S. Cl.
USPC .................................. 137/625.46; 251/367
(58) Field of Classification Search
USPC .............................. 137/625.46, 884; 251/367
See application file for complete search history.

(56) References Cited

U.S. PATENT DOCUMENTS

| | | | | |
|---|---|---|---|---|
| 5,190,077 A | * | 3/1993 | Pawelzik et al. | 137/625.46 |
| 6,550,496 B2 | * | 4/2003 | Tiemann et al. | 137/625.46 |
| 6,959,731 B2 | * | 11/2005 | Bartkus et al. | 137/625.46 |
| 7,377,291 B2 | * | 5/2008 | Moon et al. | 137/625.46 |
| 2007/0144594 A1 | | 6/2007 | Moon et al. | |
| 2009/0139589 A1 | * | 6/2009 | Di Nunzio | 137/625.46 |

FOREIGN PATENT DOCUMENTS

| WO | WO 2006070987 A1 | * | 7/2006 |
|---|---|---|---|
| WO | WO 2009/156102 | | 12/2009 |
| WO | WO 2009/156103 | | 12/2009 |

OTHER PUBLICATIONS

International Search Report dated May 30, 2011 from International Application No. PCT/US2011/026285.
Written Opinion dated May 30, 2011 from International Application No. PCT/US2011/026285.

* cited by examiner

*Primary Examiner* — John Fox
(74) *Attorney, Agent, or Firm* — Beyer Law Group LLP

(57) ABSTRACT

A micro-fluidic valve system is provided which includes a micro-fluidic valve actuator apparatus, a fluid distribution manifold and a micro-fluidic POD apparatus. The POD apparatus includes a POD housing that defines an interior central passage extending from a distal mounting end of the housing to a proximal portion thereof. The POD apparatus further includes a stator device disposed in the interior central passage, and includes a distal stator face that cooperates with an opening in the distal mounting end to define a gasket receptacle. A relatively thin, elastomeric gasket member is disposed in the gasket receptacle of the housing in abutting contact between the stator and a communication face of the manifold. A fluid-tight seal is then formed between each respective stator communication port of the stator device and a corresponding manifold communication port of the manifold.

30 Claims, 13 Drawing Sheets

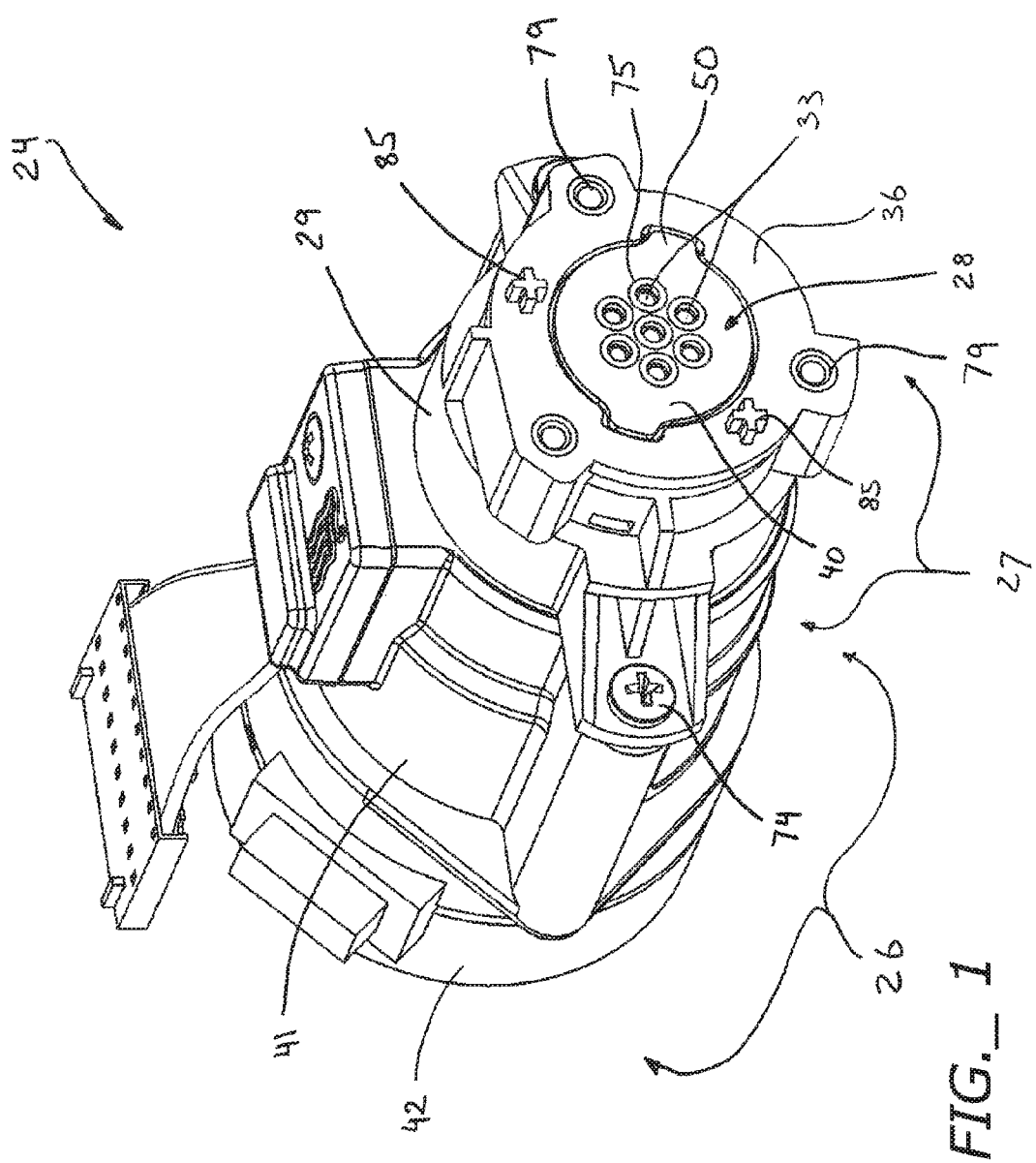
FIG._1

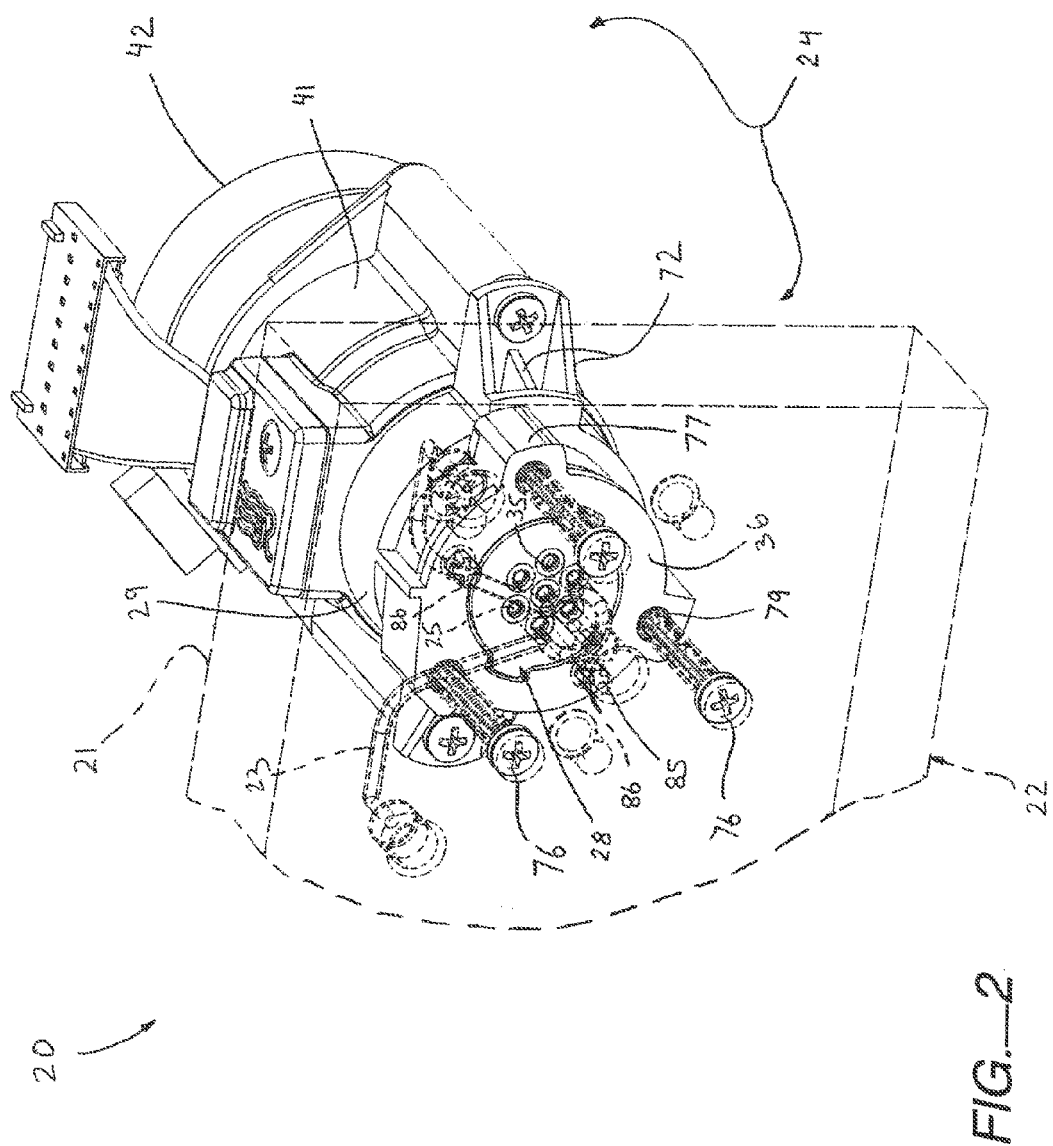
FIG._2

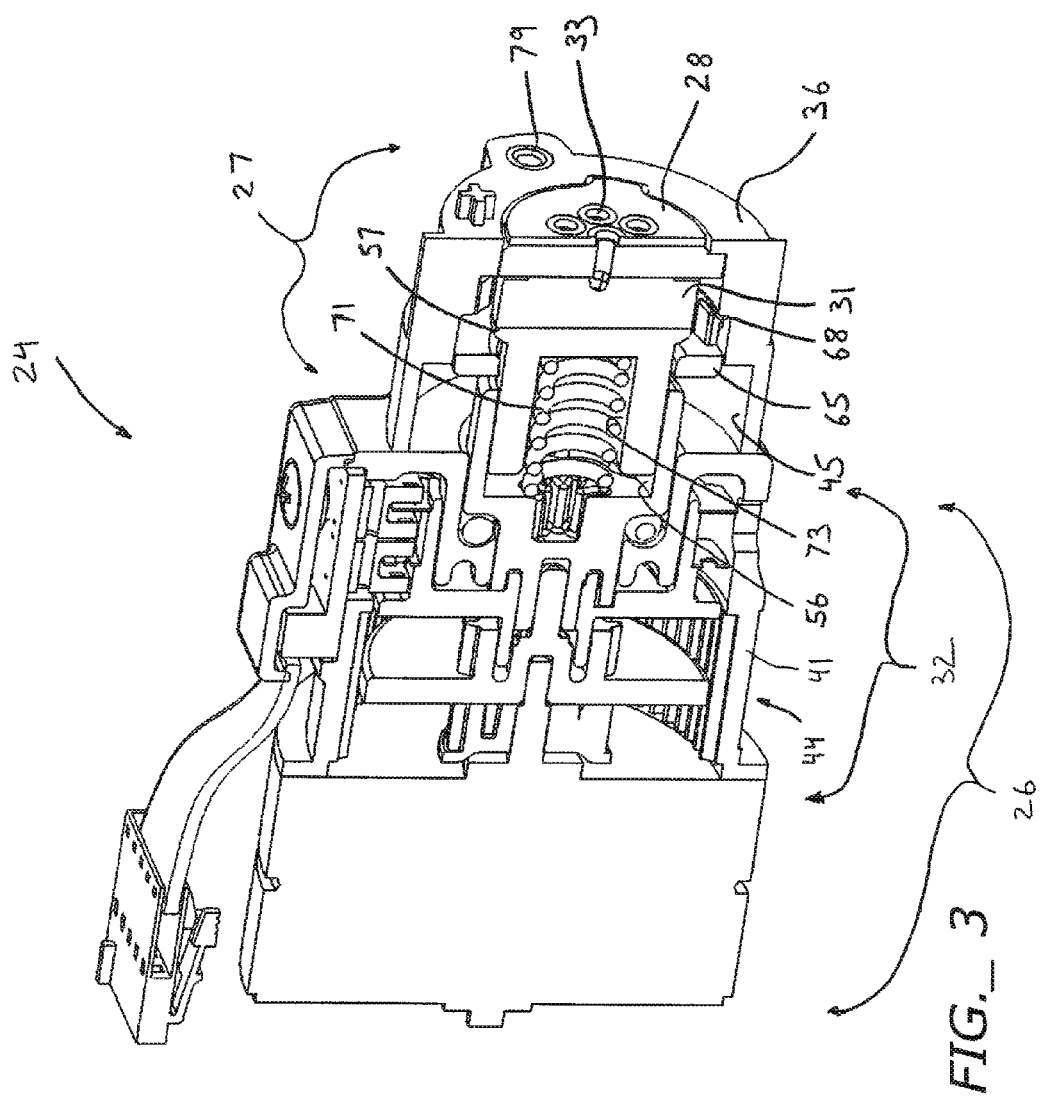
FIG._3

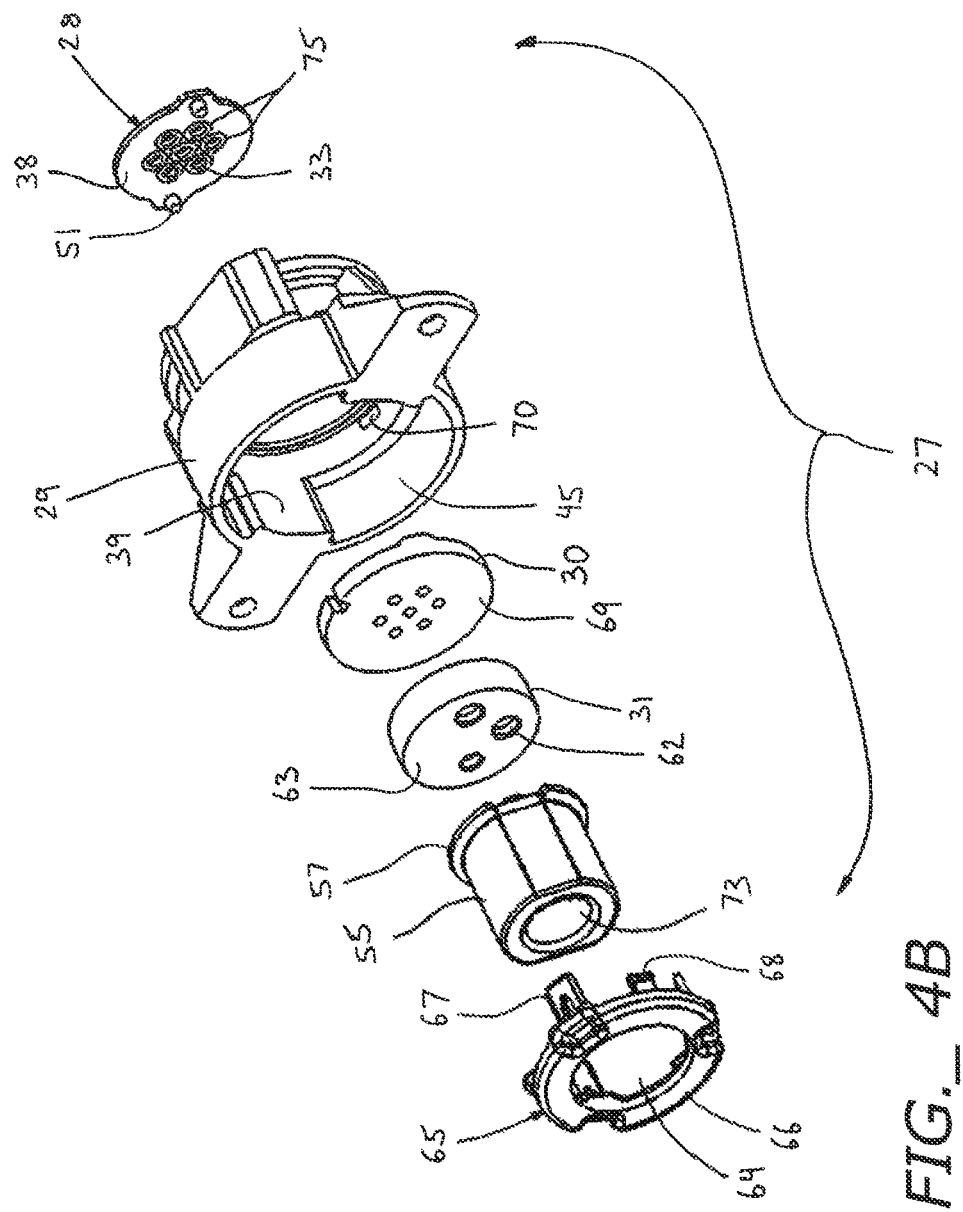
FIG._ 4B

FIG._6

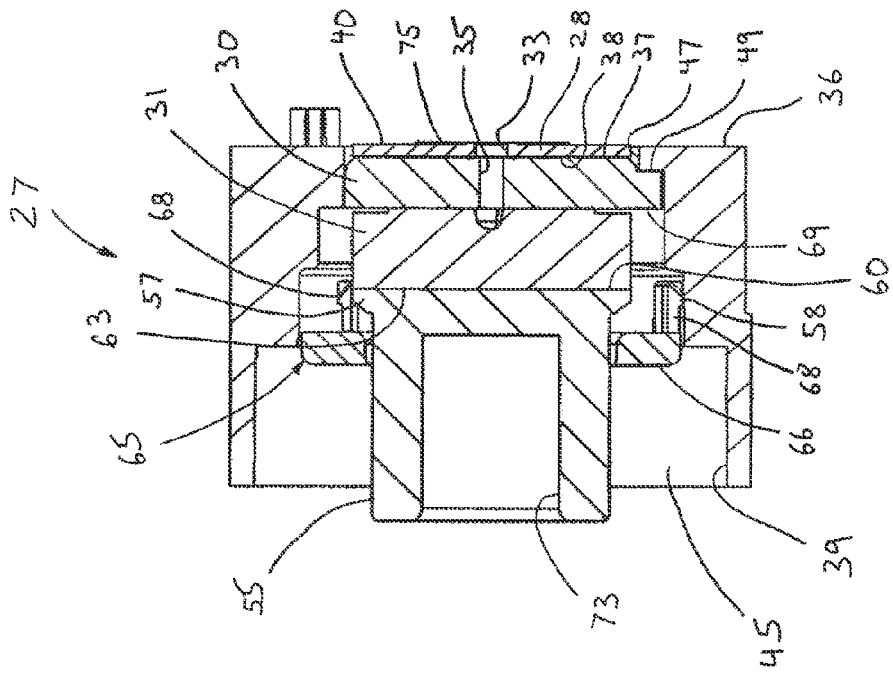
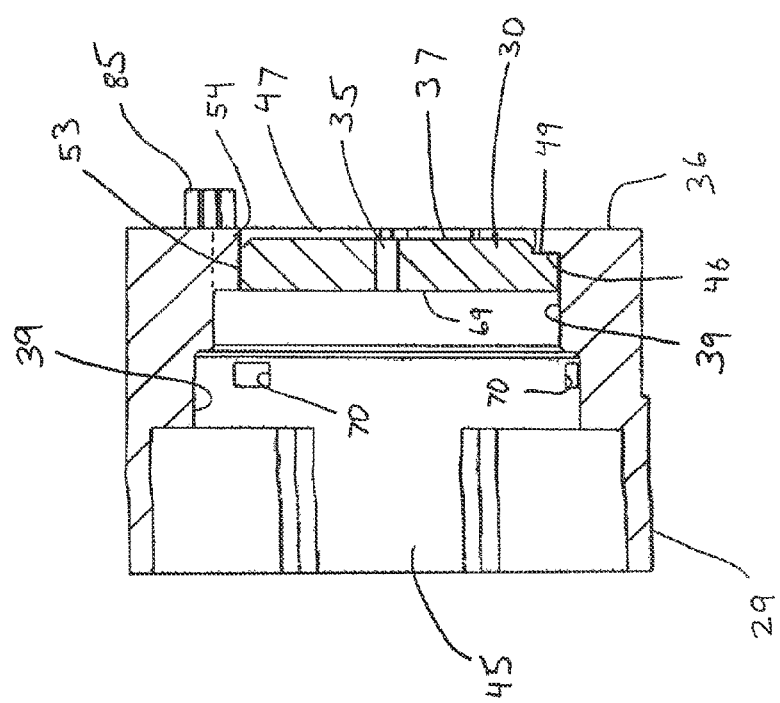
FIG._ 9
FIG._ 8

MULTI-POSITION MICRO-FLUIDIC VALVE SYSTEM

RELATED APPLICATIONS

This application claims priority under 35 U.S.C. §119(e) from U.S. Provisional Patent Application No. 61/308,232, filed Feb. 25, 2010, entitled "MULTI-POSITION MICRO-FLUIDIC VALVE ASSEMBLY SYSTEM" which is incorporated by reference in its entirety.

FIELD OF THE INVENTION

The present invention relates generally to valve assemblies, and more particularly relates to multi-position valve assemblies in the field of Invitro Diagnostics (IVD) and analytical instruments.

BACKGROUND OF THE INVENTION

Rotary shear valve assemblies are commonly used in the HPLC analytical instrument market. These valve assemblies are characterized by relatively long life and high precision fluid delivery. Many rotary valve assemblies are driven by stepper motors which are used for positioning a grooved rotor device to multiple locations on a stator device. Rotor device and stator device components are manufactured of chemically resistant plastic materials such as PEEK, PFA, MFA, and UHMWPE. Additionally, chemical inertness may be achieved through use of ceramic materials with the added benefit of long life and low wear.

Shear valve assemblies may be produced at a very low cost by means of injection molding parts traditionally produced by more expensive machining methods. Such parts include sun, planet and ring gears and a housing containing these components. Significant design and cost advantage can be gained by using injection molded parts in combination with low cost high performance stepper motors.

Solenoid valve assemblies are used in many industries. However, there are limitations with respect to performance that are not simply overlooked in IVD and analytical instrument markets. Most solenoid valve assemblies, for example, are single on/off switch devices controlling a single point of flow. When multiple points of flow control are desired, more than one solenoid valve assembly is therefore necessary. Another problem commonly associated with theses solenoid valve assemblies is an undesirable pumping phenomenon (pulsating flow variation), believed to be associated with coil, bounce, and pressure differential dynamic effects. Furthermore, solenoid valve assembly seats have been known to be susceptible to sticking and leakage problems caused by dirt or by foreign matter lodged on the seat.

To address these issues, such micro-fluidic shear valve assemblies have been mounted directly to fluid distribution manifold devices. In this manner a single shear valve assembly can replace numerous individual solenoid valve assemblies and nearly eliminate pumping phenomenon characteristic of solenoid valve assemblies.

For the most part, however, the direct mounting of shear valve assemblies to the distribution manifold devices have experienced negative effects. For example, in one particular design, epoxy is used to seal the stator device to a surface of the manifold device. Disadvantages in this art can be seen with regard to leakage and cost. The epoxy must be carefully applied between the stator device and manifold device interface, so as not to interfere with the fluid flow thorough the ports of the stator device. Moreover, the stator device and manifold device contact surfaces require costly dimensional tolerances and finishes and leakage has been known to occur at the epoxy interface. Consequently, leakage repair by removal of the stator device cannot be easily accomplished without damage to the manifold device. Often the solution is to replace the entire manifold device, incurring significant costs.

Accordingly, it is desirable to provide a micro-fluidic valve assembly that can be simply and cost effectively mounted directly to a fluid distribution manifold without leakage or operational compromise.

SUMMARY OF THE INVENTION

The present invention provides a micro-fluidic POD apparatus that is configured to operably mount a micro-fluidic valve assembly directly to a communication face of a fluid distribution manifold, in a fluid-tight manner. The POD apparatus includes a POD housing having a proximal portion and a distal mounting end. The housing proximal portion is configured to mount to the valve actuator apparatus, while the distal mounting end is configured to mount directly to the communication face of the distribution manifold. An interior wall of the POD housing defines an interior central passage extending from an opening at the housing distal mounting end to the housing proximal portion. The POD apparatus further includes a stator device defining a plurality of stator passages that terminate at respective communication ports at the distal stator face thereof. The stator device is positioned in the interior central passage, in a seated position, such that a distal stator face thereof is oriented substantially adjacent to the POD housing distal mounting end.

In accordance with the present invention, a relatively thin, elastomeric gasket member is disposed in the gasket receptacle of the housing in abutting contact between a proximal gasket face thereof and the distal stator face of the stator device. The gasket member further defines a plurality of independent through-holes, each strategically positioned such that when the POD housing is securely mounted to the distribution manifold, the distal gasket face contacts the manifold communication face, in a compressed condition, to form a fluid-tight seal between each respective stator communication port and a corresponding manifold communication port at the manifold communication face.

Accordingly, a micro-fluidic valve assembly can be directly mounted to a manifold device, providing direct fluid communication between the stator communication ports of the stator device and the corresponding manifold communication ports, aligned therewith. Additionally, this maintenance free design is capable of enduring relatively harsh chemicals for millions of actuations at high pressures up to about 7 bar (102 psi) using this specialized elastomeric gasket member. In one specific example, the elastomeric gasket member is composed of one of EPDM, Viton and FFKM with Shore A hardness ranging from 45 to 85 durometer.

In one specific embodiment, when the stator device is oriented in the seated position, and the gasket member is the disposed in the gasket receptacle, in an uncompressed condition, the distal gasket face extends distally beyond from the housing mounting end by a distance in the range of about 0.2 mm to about 0.3 mm.

In another configuration, each gasket member through-hole includes, on at least one of the proximal stator face and the distal stator face, a molded-in O-ring seal surface circumferentially upstanding respectfully therefrom, and surrounding each through-hole thereof.

The diameter of each gasket through-hole is sized slightly larger than that of each corresponding stator communication port, in the uncompressed condition. When the gasket member is compressed between the stator device and the communication face of the manifold, in the compressed condition, the diameter of each gasket through-hole is sized substantially the same as that of the corresponding stator communication port.

Still another specific embodiment provides the proximal gasket face of the gasket member that includes at least one mounting pin that extends proximally. This pin is configured for aligned sliding receipt in a corresponding alignment hole defined in the distal stator face.

Yet another specific embodiment provides a rotor element that is disposed in the housing central passage for rotation about a rotational axis thereof. The rotor element defines a distal rotor face disposed opposite to, and in abutting contact with, the proximal stator face, at a rotor-stator interface. The POD apparatus further includes a shaft adapter having a distal portion formed for engaged contact with the rotor element. A proximal portion thereof is configured to rotatably engage a drive assembly of the valve assembly for selective relative rotation between the distal rotor face and the proximal stator face.

In one specific embodiment, a pressure adjustment assembly is included that cooperates between valve drive assembly and the shaft adapter to generate an axial compression pressure between the distal rotor face and the proximal stator face, at a rotor-stator interface, to enable fluid-tight relative rotation therebetween. The pressure adjustment assembly is preferably provided by a compression spring having a distal portion cooperating with the shaft adapter, and a distal portion cooperating with the valve shaft.

A distal face of the shaft adapter includes two or more alignment posts extending distally thereof. These posts are configured for aligned sliding receipt in corresponding alignment recesses defined in the proximal rotor face of the rotor.

Yet another specific configuration provides a cap retainer configured to engage the interior wall of the POD housing, in an engaged position, releasably retaining the stator device in the seated condition. The shaft adapter is generally cylindrical shaped, having a first diameter, and a distal annular flange portion having a second diameter that is greater than the first diameter. The cap retainer includes an annular ring body that defines a central through-passage having a retainer diameter sized to permit rotatably receipt of the first diameter of the shaft adapter. The retainer diameter, however, is sized to prevent axial passage of the annular distal flange portion of the shaft adapter therethrough, having the second diameter. In accordance with the present invention, the rotor element can be loosely retained against the stator device when the shaft adapter is not in engaging contact with the drive assembly of the micro-fluidic valve assembly.

In still another embodiment, the cap retainer includes a plurality of retaining legs spaced radially about, and depending distally from, the ring body. The retaining legs are configured to radially extend around both the annular distal flange portion of the shaft adapter and the rotor element to permit selective relative rotation thereof about the rotation axis. The distal ends of the retaining legs are sized and dimensioned for abutting contact against the proximal stator face to retain the stator device in the seated condition, when the cap retainer is in the engaged position.

In another aspect of the present invention, a micro-fluidic valve assembly is provided that is operably mounted between a drive motor and the fluid distribution manifold. The valve assembly includes an assembly housing having a proximal portion and a distal mounting end configured for mounting contact with the communication face of the distribution manifold. The assembly housing further includes an interior wall defining an interior central passage extending from an opening at the housing distal mounting end to the housing proximal portion thereof. A drive assembly is positioned within the central passage proximate to the housing proximal portion, and is rotatably coupled to the drive motor. The valve assembly further includes a rotor element and a stator device engaged with one another at the rotor-stator interface. The rotor element includes a distal rotor face, and is rotatably coupled to the drive assembly for selective rotation about a rotational axis thereof between a plurality of discrete fluid distribution positions. The stator device is disposed in the interior central passage, in a seated position, such that a distal stator face thereof is oriented substantially adjacent to the distal mounting end of the assembly housing. The distal stator face and the housing opening collectively define a gasket receptacle, when the stator device is oriented in the seated position. The stator device further defines a plurality of stator passages terminating at respective communication ports at the distal stator face. A relatively thin, elastomeric gasket member is provided having a proximal gasket face and an opposed distal gasket face. The gasket member is configured for disposition in the gasket receptacle of the housing in abutting contact between the proximal gasket face and the distal stator face. When the assembly housing is securely mounted to the distribution manifold, the distal gasket face of the gasket member, which defines a plurality of independent through-holes, each of which is strategically positioned, contacts the manifold communication face, in a compressed condition. A fluid-tight seal is then formed between each respective stator communication port and a corresponding manifold communication port.

In one specific configuration, a pressure adjustment assembly cooperates between a valve shaft of the drive assembly and the shaft adapter to generate an axial compression pressure between the distal rotor face and the proximal stator face, at a rotor-stator interface, to enable fluid-tight relative rotation therebetween.

Yet another embodiment provides a pressure adjustment assembly that includes a compression spring having a distal portion cooperating with the shaft adapter, and a proximal portion cooperating with the valve shaft. The valve shaft defines a distal receptacle formed and dimensioned for snug, sliding axial receipt of the proximal portion of the shaft adapter therein.

Still yet another arrangement provides the shaft adapter with proximal end that defines a spring receptacle, having a distal interior wall. The pressure adjustment assembly includes a compression spring that is disposed in both the distal receptacle of the valve shaft and the spring receptacle of the shaft adapter when the shaft adapter is slideably received, axially, in the valve shaft distal receptacle. This biases the rotor element toward the proximal stator face for fluid-tight contact therebetween at the rotor-stator interface.

In still another aspect of the present invention, a micro-fluidic valve system is provided including a micro-fluidic valve actuator apparatus, a fluid distribution manifold and a micro-fluidic POD apparatus. The valve actuator apparatus includes an actuator housing and a drive assembly. The fluid distribution manifold includes a communication face and a plurality of fluid distribution channels each having a respective communication port terminating at the manifold communication face. Collectively, the valve actuator apparatus and the POD apparatus make up a micro-fluidic valve assembly which is directly mounted to the communication face of the manifold, via the POD apparatus.

In accordance with this aspect of the present invention, the POD apparatus includes a POD housing having a proximal portion, a distal mounting end, and an interior wall defining an interior central passage. This passage extends from an opening at the housing distal mounting end to the housing proximal portion. The POD apparatus further includes a stator device disposed in the interior central passage, in a seated position, such that a distal stator face thereof is oriented substantially adjacent to the POD housing distal mounting end. Collectively, the distal stator face and the POD housing opening define a gasket receptacle, when the stator device is oriented in the seated position. A relatively thin, elastomeric gasket member is provided having a proximal gasket face and an opposed distal gasket face. The gasket member is configured for disposition in the gasket receptacle of the housing in abutting contact between the proximal gasket face and the distal stator face. When the assembly housing is securely mounted to the distribution manifold, the distal gasket face of the gasket member, which defines a plurality of independent through-holes, each of which is strategically positioned, contacts the manifold communication face, in a compressed condition. A fluid-tight seal is then formed between each respective stator communication port and a corresponding manifold communication port.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 1 is a bottom perspective view of a micro-fluidic valve assembly that incorporates a POD apparatus constructed in accordance with the present invention.

FIG. 2 is a bottom perspective view of a micro-fluidic valve system also constructed in accordance with the present invention.

FIG. 3 is an enlarged side perspective view, in cross-section, of the micro-fluidic valve assembly of FIG. 1.

FIG. 4B is an exploded, top perspective view of a POD apparatus of the micro-fluidic valve assembly of FIG. 1.

FIG. 8 is a side elevation view, in cross-section, of the POD housing of FIG. 6, illustrating the stator element into the seated position.

FIG. 9 is an enlarged, side elevation view, in cross-section, of the POD apparatus of FIG. 4.

DETAILED DESCRIPTION OF THE INVENTION

Figure 4A:
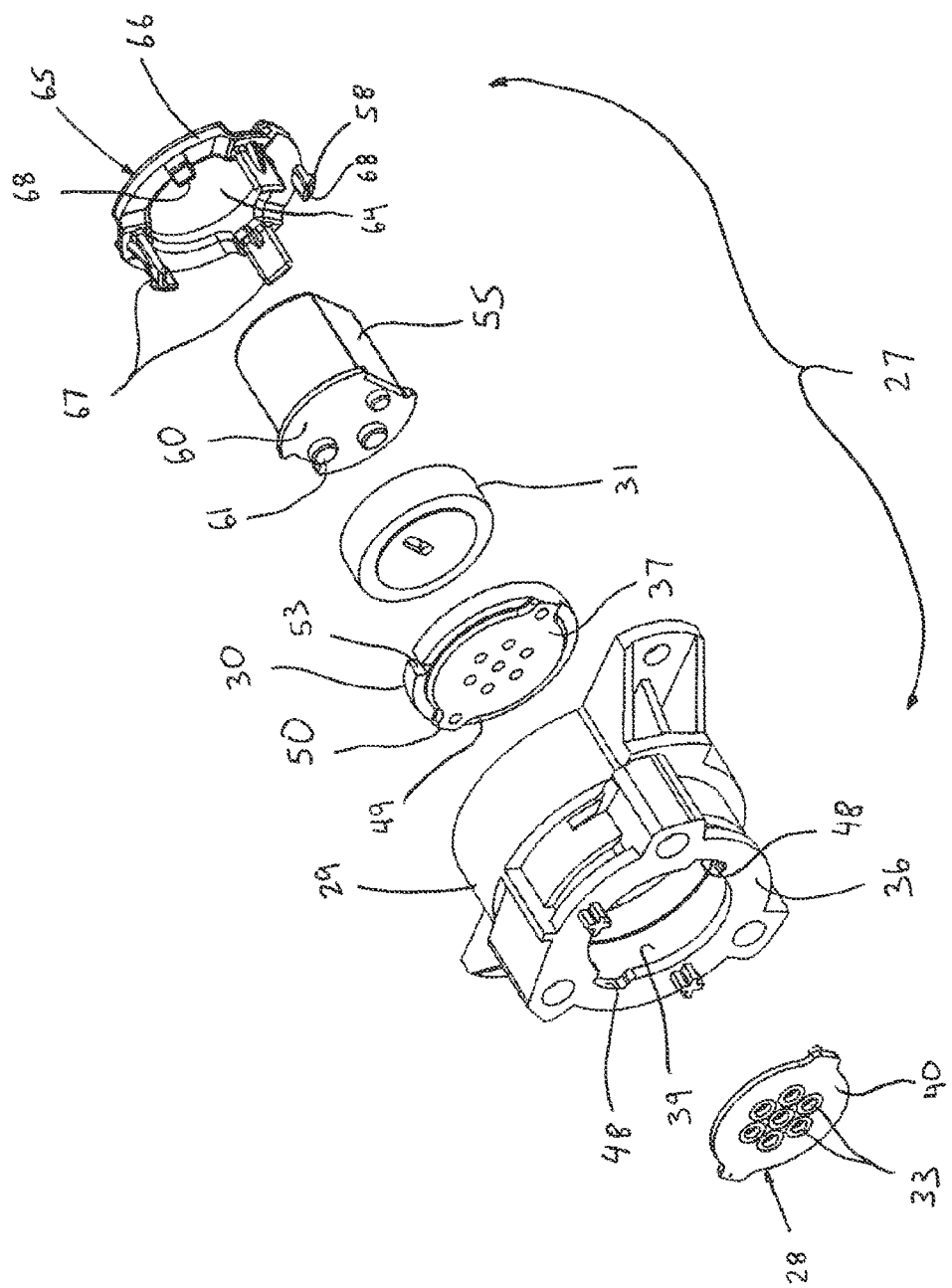
FIG. 4A is an exploded, bottom perspective view of a POD apparatus of the micro-fluidic valve assembly of FIG. 1.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Turning now to FIGS. 1-4 and 10-13, a micro-fluidic valve system, generally designated 20, is provided that is capable directly mounting a micro-fluidic valve assembly 24 directly to a communication face 21 of a fluid distribution manifold device 22, for liquid-tight coupling to communication ports 25 of the manifold. The entire valve system 20, broadly, includes the micro-fluidic valve assembly 24 and the manifold device 22 upon which it is mounted. The micro-fluidic valve assembly 24, on the other hand, is essentially comprised of a valve actuator apparatus 26, which generally includes an actuator housing 41 and a drive assembly 32, and a micro-fluidic POD apparatus 27, which generally includes a rotor element 31, a stator device 30, as well as structural provisions (which will be described) that enable fluid-tight coupling of the respective communication ports 35 of the stator device directly to corresponding communication ports 25 one the face 21 of the manifold device 22.

In accordance with the present invention, the POD apparatus 27 includes a POD housing 29 having a proximal portion, a distal mounting end 36, and an interior wall 39 (FIG. 8) defining an interior central passage 45 extending from an opening into the passage, at the housing distal mounting end 36, to the housing proximal end. The stator device 30 is disposed in the interior central passage 45, in a seated position (FIGS. 3, 8 and 9), such that a distal stator face 37 thereof is oriented substantially adjacent to the POD housing distal mounting end 36. The stator device provides a plurality of stator passages extending axially therethrough, each of which terminates at respective communication ports 35 at distal stator face 37. Collectively, as best shown in FIG. 8, the distal stator face 37 and the POD housing opening into the central passage 45, at the distal mounting end 36, defining a distal gasket receptacle 47, when the stator device is oriented in the seated position.

A relatively thin, elastomeric gasket member 28 (FIGS. 3, 9 and 11) is configured for disposition in the gasket receptacle 47 of the POD housing 41 in abutting contact between a proximal gasket face 38 and the distal stator face 37. The gasket member 28 further defines a plurality of independent through-holes 33, each strategically positioned such that when the POD housing 29 is securely mounted to the communication face 21 of the distribution manifold device 22, a distal gasket face 40 contacts the manifold communication face 21, in a compressed condition (i.e., when mounted to the manifold device 22 (FIGS. 2, 10 and 13)), to form a fluid-tight seal between each respective stator communication port 35 and a corresponding manifold communication port 25.

Accordingly, when the POD apparatus 27 is mounted directly to the manifold device 22, the manifold communication ports 25 provide direct fluid communication with the corresponding communication ports 35 of the stator device 30, aligned therewith. A relatively low cost valve assembly, thus, is provided, having the ability to seal the micro-fluidic valve assembly directly to a manifold device with less than 1.0 uL/min leakage. Through the application of this specialized elastomeric gasket 28, in addition, this system is capable of enduring relatively harsh chemicals for millions of actuations at high pressures up to 7 bar (102 psi). Moreover, by selecting more recent ceramic stator device and rotor device materials for the stator and rotor components, highly desirable maintenance free operation may be achieved, even through millions of actuations.

Referring back to FIGS. 1-3, the manifold device 22 defines a plurality of fluid channels 23 that terminate at fluid communication ports 25 disposed at the manifold device communication face 21. The valve assembly 24, on the other hand, selectively determines the direction of the liquid flow through communication ports 25 of the manifold device 22, via rotor element 31, and is comprised of three primary components, as mentioned: valve actuator apparatus 32, the POD apparatus 27 and the elastomeric gasket 28.

The POD apparatus 27, its POD housing 29 of which contains a shear or rotary valve (i.e., a stator device 30 and a rotor device 31) therein, together with the valve actuator apparatus 26 (i.e., collectively the valve assembly 24), can then mounted directly to the communication face 21 of the manifold device 22.

In accordance with the present invention, as above-indicated, to facilitate and promote a liquid tight seal between the stator device 30 and the manifold device communication face 21 under harsh usage conditions, a special elastomeric gasket 28 is disposed therebetween. This gasket 28 (FIG. 11), preferably contained within gasket receptacle 47 of the POD apparatus 27, is relatively thin and defines a plurality of through-holes 33, each of which is aligned with, and correspond to, respective manifold fluid communication ports 25 and the stator fluid communication ports 35. Upon compression mounting of the POD apparatus 27 to the manifold device communication face 21, the liquid impervious, elastomeric gasket 28 is compressed between the micro-fluidic valve assembly 24 and the manifold device 22, creating a seal therebetween. Specifically, a liquid-tight seal is created between the distal stator face 37 of the stator device 30 and a proximal gasket face 38 of the gasket 28, while another liquid-tight seal is created between the distal gasket face 40 of the gasket and manifold device communication face 21.

As mentioned, the valve assembly 24 is primarily comprised of three components: the valve actuator apparatus 26, the POD apparatus 27, and the elastomeric gasket 28, the POD apparatus of which receives and seats the elastomeric gasket 28. As best illustrated in FIGS. 3, 4A and 4B, valve actuator apparatus 26 includes the actuator housing 41, a stepper motor 42 and the drive assembly 32 that transmits rotational movement from the motor 42 to the rotor element 31. In one specific embodiment, the drive assembly 32 intercoupled the motor 42 to the POD apparatus 26 by means of a valve shaft 43 and a planetary gear system 44.

An alternate drive system (not shown) may be used in which the valve shaft 43 directly engages the motor 42 without the use of intermediary gears. In this configuration, the decreased motor torque, resulting from the absence of a gear system, may be compensated for by applying a motor with greater torque. The Rheodyne Titan EZ valve, Model EZ670-000-4, manufactured by IDEX Health & Science, for example, achieves up to 7 in-lbs of torque combining a 42 mm tin can stepper motor with an injection molded planetary gear system.

The POD housing 29 is generally cylindrical-shaped, and defines a central passage 45 axially therethrough which extends from the opening at the distal mounting end 36 to the proximal end thereof (FIGS. 4 and 8). The stepped interior wall 39, forming the central passage 45, is sized and dimensioned for seated receipt of the stator device 30, when assembled in a seated position (see FIGS. 6, 8 and 9). To facilitate proper seating of the stator device 30, and thus, proper orientation of the distal stator face 37 relative to the housing distal mounting end 36, the housing 29 includes a step feature 46. Disposed at a distal portion of the central passage 45 and extending radially inwardly, this step feature 46 is sized and dimensioned to seat against a correspondingly sized and dimensioned outer circumferential recess flange 49 of the stator device 30 (FIGS. 7-9).

Once the stator device 30, seats axially against the step feature 46, both of which are correspondingly keyed, further axial displacement, distally, is prevented. FIG. 8 best illustrates that when the stator device 30 is seated, the distal stator face 37 is spaced just below flush of the distal mounting end 36, forming the gap or gasket receptacle 47 upon which the elastomeric gasket is disposed.

Figure 5:
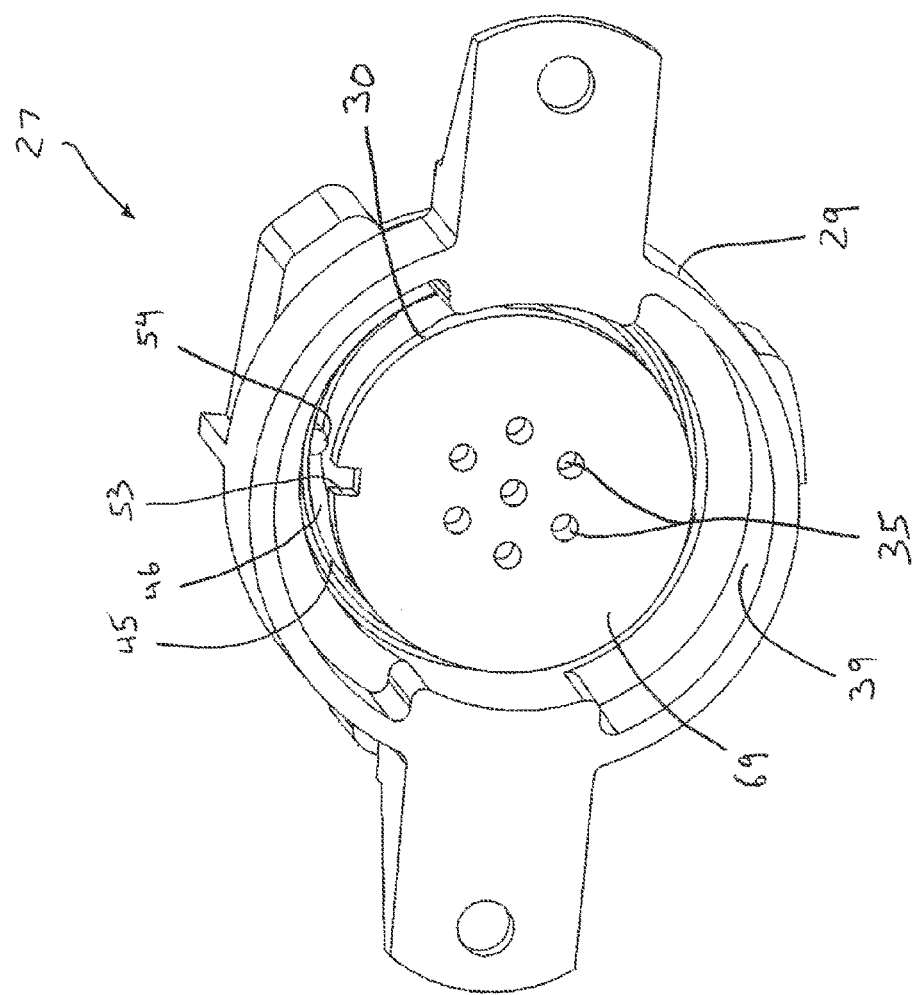
FIG. 5 is an enlarged, partially exploded, top perspective view of a POD housing of the POD apparatus of FIG. 4, illustrating insertion of the stator element into the POD housing.
Figure 6:
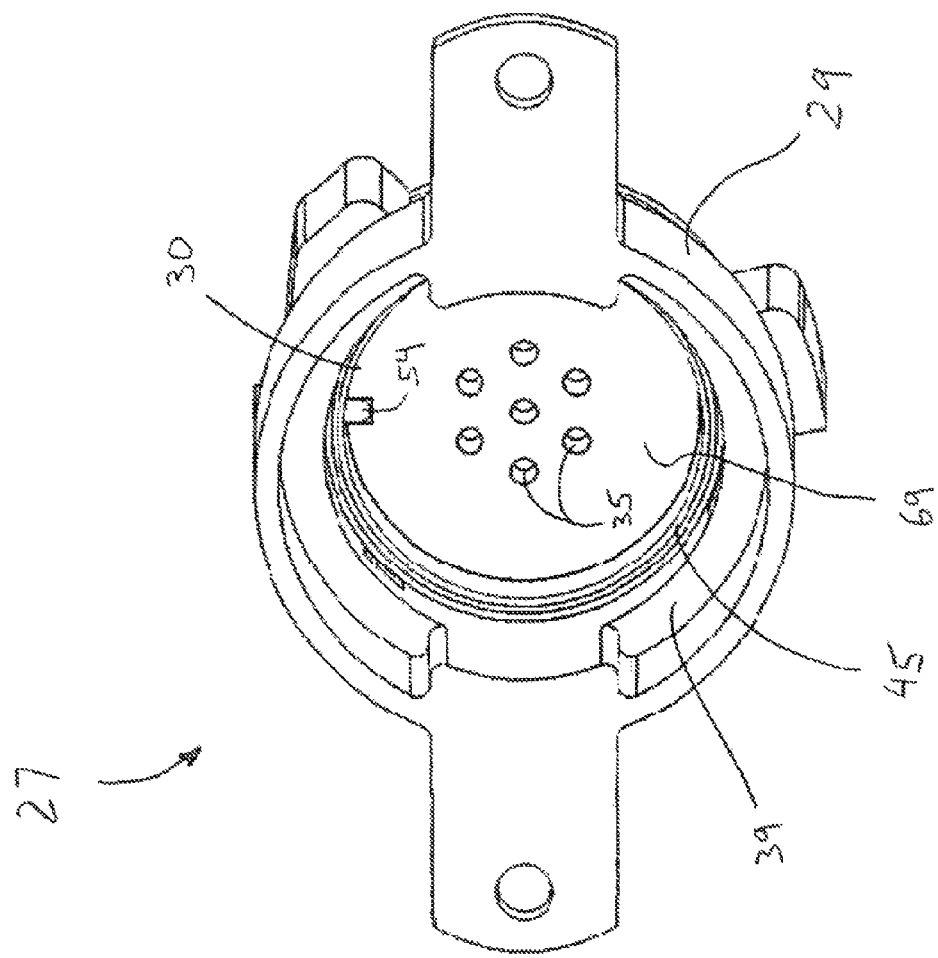
FIG. 6 is an enlarged, top perspective view of the POD housing of FIG. 5, illustrating the stator element into the seated position.
Figure 7:
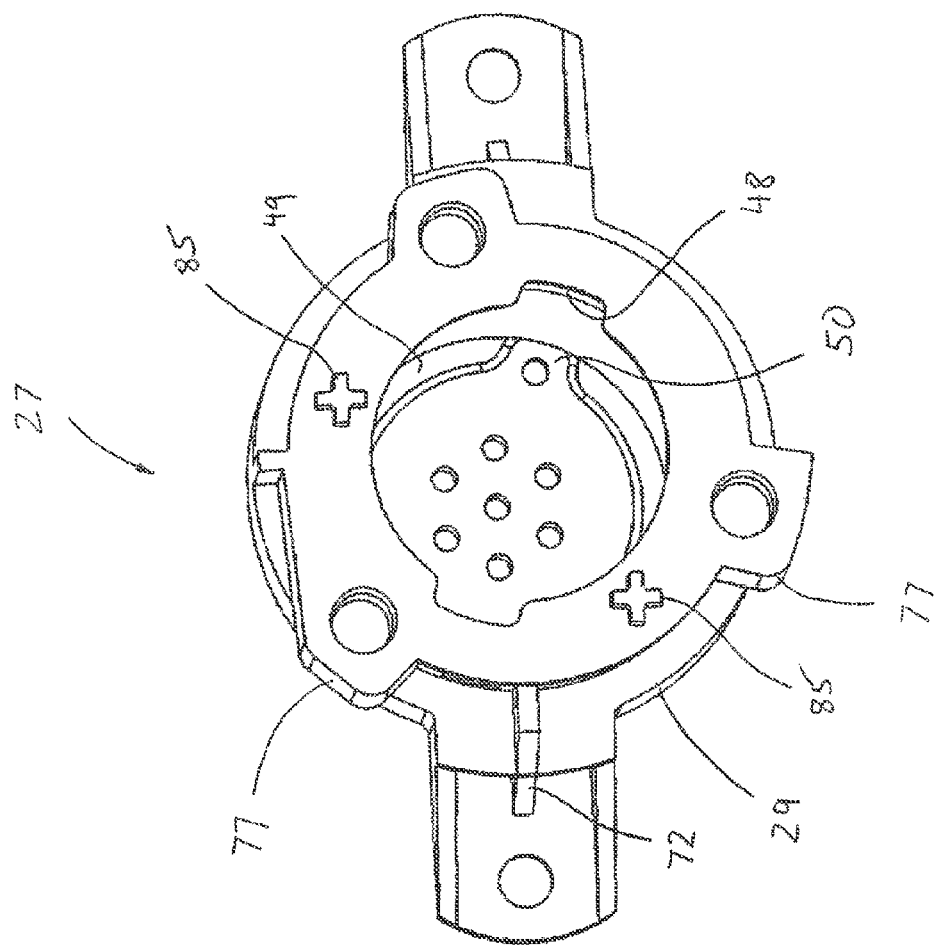
FIG. 7 is an enlarged, partially exploded, bottom perspective view of the POD housing of FIG. 5, illustrating insertion of the stator element into the POD housing.

As best viewed in FIGS. 4A and 7, both the stator device 30 and POD housing 29 are keyed for proper rotational alignment therebetween, in addition to the above mentioned stepped features. The distal mounting end 36 of the POD housing 29, for example, defines a pair of stator alignment cutouts 48. Corresponding to these cutouts is a pair of alignment features 50 that align the stator device 30 in the correct position relative to the remaining valve assembly 24, when inserted within the POD housing 29. Furthermore, as shown in FIGS. 5 and 6, the stator proximal face 69 defines an alignment cutout 53 which is formed and dimensioned for receipt of a POD alignment feature 54 therein to further facilitate aligned seating. Collectively, these alignment structures not only facilitate alignment, but also prevent rotation of the stator device 30 in the POD housing 29 when the rotor element 31 rotates thereagainst.

To mechanically couple the rotor device 31 to the drive assembly 32, the POD apparatus 27 (see FIGS. 3, 4A, 4B and 9) includes a shaft adapter 55 which rotatably engages the drive valve shaft 43 to enable rotation of the rotor device. The valve shaft 43 defines a distal receptacle 56 which formed and dimensioned for snug, sliding axial receipt of a proximal portion of the shaft adapter 55 therein. An interior wall that define the distal receptacle 56 of the valve shaft 43 and a proximal exterior wall that defines the proximal portion of the shaft adapter 55 are both correspondingly keyed such that any torque and rotation of the valve shaft about its longitudinal axis is transferred to the shaft adapter. An annular distal flange portion 57 of the shaft adapter flares radially outward to a diameter similar to that of the rotor device 31. Thus, the first diameter of the proximal portion of the shaft adapter is correspondingly less than the second diameter of the distal flange portion 57. A distal adapter face 60 of the shaft adapter 55, at the annular distal flange portion 57, is formed to seat the rotor device 31 thereagainst.

Protruding axially outward from the distal adapter face 60 of the shaft adapter 55 are one or more alignment posts 61 that are formed and dimensioned for sliding receipt in corresponding recesses 62 (FIGS. 4A and 4B) is in a proximal rotor face 63 of the ceramic rotor device 31. The alignment posts 61 and corresponding recesses 62 are sized and placed to align the rotor device relative to the valve shaft 43. Furthermore, the posts 61 function to transfer any torque and rotation of the shaft adapter 55 about its longitudinal axis to the rotor device.

As best viewed in FIGS. 3, 4A, 4B and 9, a cap retainer 65 is incorporated to loosely retain the rotor device 31, as well as retain the shaft adapter 55, to the POD housing 29. This advantageous in that the POD apparatus 27 can be easily mounted to the valve actuator apparatus 26 as a single unit.

The cap retainer 65 is preferably also injection molded, having a thin annular ring body 66 that defines a through-passage 64 sized to rotatably receive the first diameter of shaft adapter therein. The diameter of the through-passage 64, however, is sized and dimensioned to prevent axial passage of the annular distal flange portion 57 of the shaft adapter therethrough. Accordingly, when the cap retainer 65 is mounted to the POD housing, in an engaged position (FIGS. 3 and 9) as will be described below, the diametric tolerance between the first diameter of the shaft adapter and that of the ring body through-passage 64 permit unimpaired relative rotation thereof. On the other hand, the second diameter of the flange portion 57 prevents proximal passage through the cap retainer 65, loosely retaining the shaft adapter 55, and the mounted rotor device 31, to the POD housing 29. It will be appreciated, of course, that in order to prevent separation of the shaft adapter 55 and the rotor device 31, the length of the alignment posts 61 should be greater than the permitted axial displacement or play between the distal flange portion 57 and the annular ring body 29.

Figure 10:
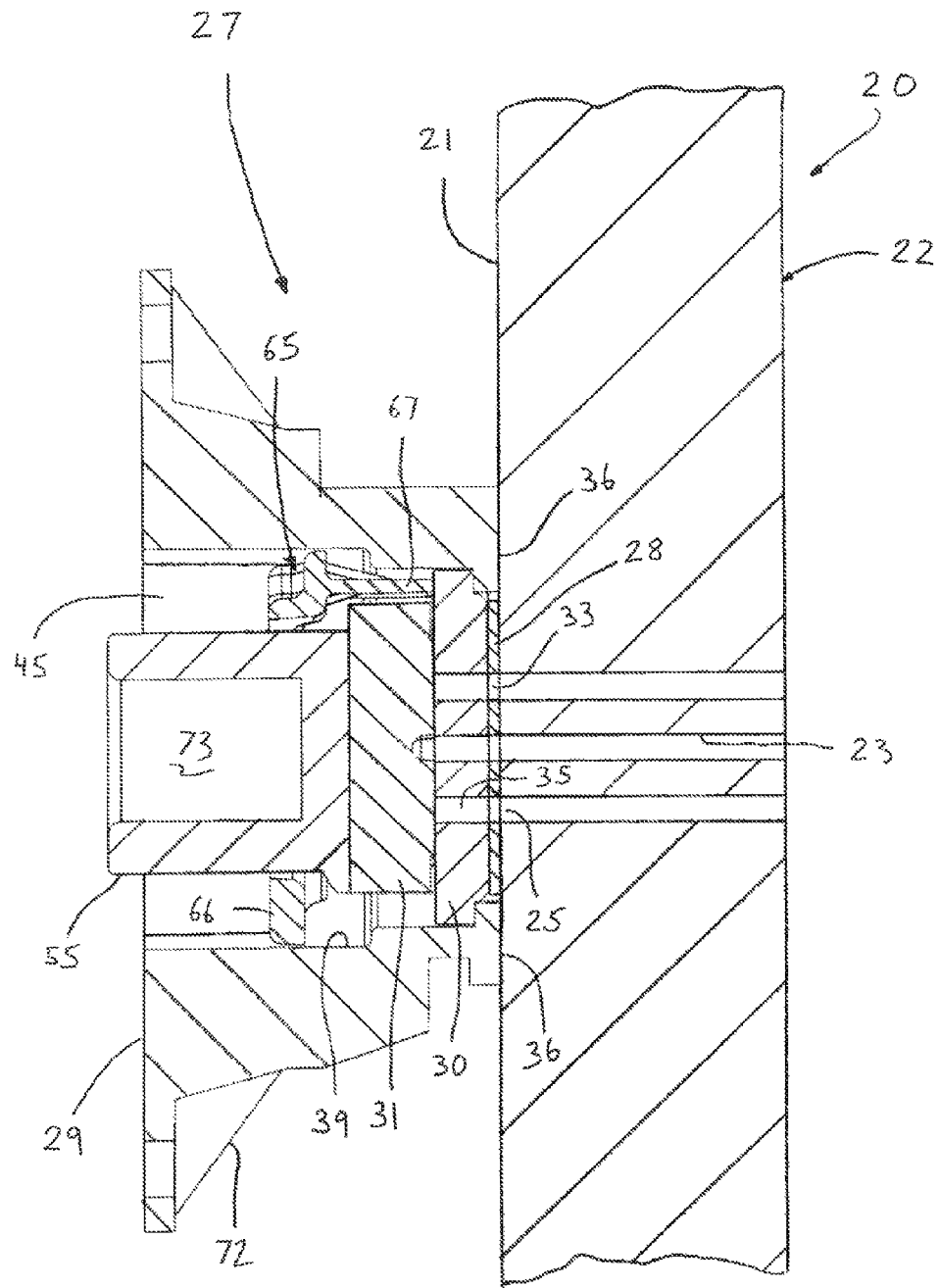
FIG. 10 is an enlarged, side elevation view, in cross-section, of the POD apparatus of FIG. 4, shown mounted to the manifold device.

Referring now to FIGS. 4A, 4B and 10, extending distally from the annular ring body 66 is a plurality of radially spaced retaining legs 67, as well as a plurality of radially spaced snap hooks 68 alternatively positioned between each retaining leg 67. Preferably, the cap retainer 65 includes three equally spaced retaining legs 67 radially about a longitudinal axis of the ring body 66, and three equally spaced snap hooks 68 positioned therebetween. Both the retaining legs 67 and the snap hooks 68 are diametrically positioned to extend around the shaft adapter.

During assembly, when the shaft adapter 55 and rotor device 31 are disposed atop the stator device 30 in the POD housing 29, the cap retainer 65 is inserted into the POD housing 29. The diametric orientation of both the retaining legs 67 and the snap hooks 68, relative to the ring through-passage 64, is configured to extend circumferentially around the shaft adapter 55 as the proximal portion of the shaft adapter 55 is positioned, relatively, through the ring body 66. Each snap hook 68 includes a tang portion 58 which is formed and dimensioned engage and lock into corresponding receiving windows 70 in the POD housing 29, locking the cap retainer in the central passage 45 of the POD housing 29, in an engaged position. Simultaneously, the retaining legs 67 are distally sized to abut against the proximal stator face 69 of the stator device 30, retaining and seating the circumferential recessed flange 49 against the POD housing step feature 46, in the seated condition. In this configuration, as mentioned, both the shaft adapter 55 and the rotor device 31 are permitted a minor amount of axial displacement in the POD housing 29 when the POD apparatus is not mounted to the drive assembly 32.

Once assembled, the stator device 25, the rotor device 31, the cap retainer 65 and the shaft adapter 55 are contained within the central passage 45 of the POD housing, as shown in FIGS. 1, 3 and 8. The POD apparatus 27 can then be mounted or coupled to the actuator housing 41 of the valve actuator apparatus 26. For instance, the POD housing 29 may be mounted to the actuator housing 41 at two locations using standard 4-40 screws 74. At these two regions, ribs 72 are molded into the POD housing to provide structural strength against internal spring forces and external bending forces. As with most shear valve assemblies, the stator device 30 is stationary relative to the POD apparatus while the rotor device 31 rotates as it is driven by the valve shaft 43 in the actuator housing 41.

The ceramic stator device 30 and rotor device 31 form a liquid tight seal at a rotor/stator interface thereof when loaded by a compressive force, and can withstand up to millions of actuations in the presence of liquids ranging from de-ionized water to salt solutions. To create the compressive force between the stator device 30 and the rotor element 31, at the rotor/stator interface, a pressure adjustment assembly 71 cooperating between drive assembly 32 and the shaft adapter 55 to generate an axial compression pressure between a distal rotor face and the proximal stator face 69, at a rotor-stator interface, to enable fluid-tight relative rotation therebetween.

In one specific embodiment, the pressure adjustment assembly 71 is provided a helical compression spring 71, as the primary force mechanism, to fluid-tight seal the rotor element 31 against the stator device 30. As best illustrated in FIG. 3, the shaft adapter 55 defines a spring receptacle 73 accessible at a proximal end of the adapter. During assembly of the POD apparatus 27 to the valve actuator apparatus 26, and, thus, the valve shaft 43 of the drive assembly 32 to the shaft adapter 55, the helical compression spring 71 is disposed therebetween. Upon compression of the spring therebetween, the shaft adapter 55 is biased axially toward the stator device 30, forming the fluid tight seal at the rotor/stator interface. The helical spring, therefore, displaces the annular distal flange portion 57 of the shaft adapter 55 axially a sufficient distance from the cap retainer ring body 66 so as to prevent interfering contact. Moreover, the spring functions to accommodate minor axial size variations between the interacting components.

It will be appreciated that although a pressure adjusting mechanism 71 (FIG. 3), is the primary force seating the stator device 30, in the seated position against POD housing 29, the cap retainer legs 67 of the cap retainer 65 also provide an additional holding force thereagainst. Therefore, the combined spring force and the cap retainer 65 retain the stator device 30 in place against compression of the elastomeric gasket 28, collectively creating more than sufficient force to seal at the stator device/rotor element, stator device/gasket and gasket/manifold device interfaces.

Briefly, although ceramics are emphasized with respect to the stator device 30 and the rotor element 31, it will be appreciated that other materials may be used such as PEEK, PFA, MFA, and UHMWPE, although wear life and pressures may change. Moreover, other hard-on-hard application may be implemented such as those described in U.S. application Ser. No. 12/833,834 to Tower, filed Jul. 9, 2010, entitled "ROTARY SHEAR VALVE ASSEMBLY WITH HARD-ON-HARD SEAL SURFACES", and incorporated herein by reference in its entirety.

In accordance with the present invention, as mentioned above, the valve assembly 20 is liquid-tight sealed to the manifold device 22 (see FIGS. 2, 10 and 13) by means of a molded elastomeric gasket 28 that is disposed in the gasket receptacle 47 at the distal mounting end 36 of the POD apparatus 27. The height of the gasket 28 is such that the distal gasket face 40 thereof extends slightly above flush of distal mounting end 36 of the POD housing 29 (FIG. 9). Hence, when the valve assembly 20 is mounted to the manifold device, the elastomeric gasket 28 is compressed, forming the liquid-tight seal around and between the manifold and stator communication ports 25, 35. In one specific embodiment, using the material composition of the elastomeric gasket 28 set forth below, when gasket member 28 is the disposed in the gasket receptacle 47, in an uncompressed condition, the distal gasket face 40 extends distally beyond from the housing mounting end 36 by a distance in the range of about 0.2 mm to about 0.3 mm.

As best viewed in FIGS. 1, 4 and 10, the elastomeric gasket 28 includes a molded-in O-ring-style seal surfaces 75 circumferentially upstanding from both the proximal and distal gasket face 38, 40, and surrounding each through-hole 33 thereof. These surrounding sealing surfaces 75 function to optimize the sealing area such that sufficient sealing is achieved with minimal spring forces. Lower forces are desirable in order to minimize the stator device/rotor device sealing forces which results in longer life and lower wear. Similarly, in the uncompressed condition, these O-ring style sealing surfaces 75 extends proximally and distally beyond from the respective gasket faces 38, 40 by a distance in the range of about 0.1 mm to about 0.2 mm.

Furthermore, the gasket 28 is designed with through-holes 33 that are slightly larger in diameter than that of the communication ports 25, 35 in the respective mating manifold device and stator device (See FIG. 9). The purpose is to take into account gasket compression deformation of the gasket during installation which causes the gasket holes to shrink.

Additionally, the bolt circle of the pattern of gasket holes 33 may be decreased slightly, if necessary, such that when compressed during installation it will increase and match the bolt circle of the pattern of holes in both the stator device and manifold device. Finally, the size of the sealing surface is custom designed to optimize factors such as compression area, force, and deformation taking into account the elastic modulus of the gasket material. Depending on properties of the gasket, dimensions of the sealing area and thickness of the gasket, a range of forces are necessary to compress and seal within the space defined by the pod and stator device. This invention is designed to accommodate a wide variety of gasket materials including EPDM, Viton and FFKM with Shore A hardness ranging from 45 to 85 durometer while using the same components to minimize cost. Accordingly, it is desirable to provide a shear face valve assembly capable of holding pressures greater than about 50 psi that have expected valve assembly lifetimes greater than 50K cycles.

Figure 11:
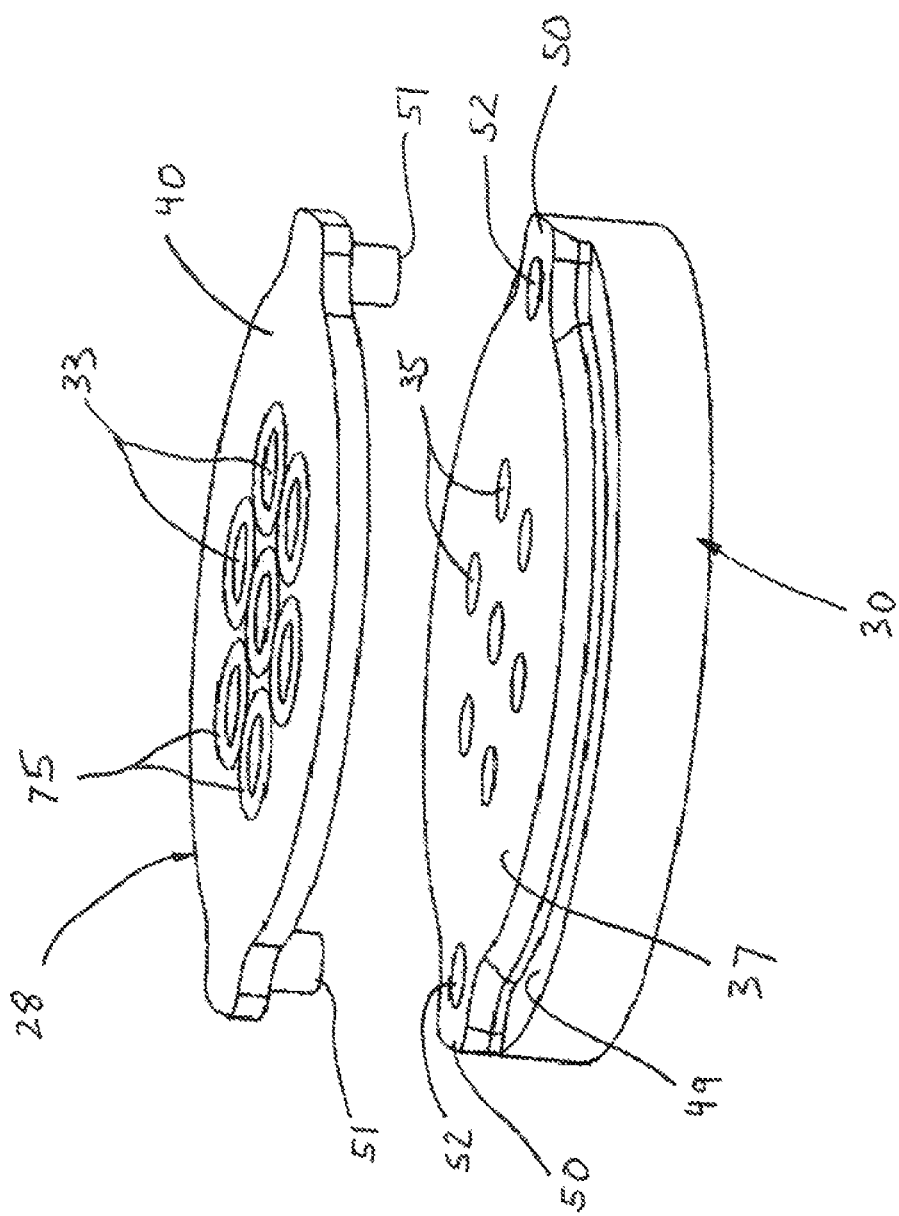
FIG. 11 is an enlarged, exploded, bottom perspective view of the stator device and an elastomeric gasket member of the POD apparatus of FIG. 4.

Briefly, to co-align the through-holes 33 of the gasket member 28 with those of the stator device 30, two molded-in mounting posts 51 are provided which are received in alignment holes 52 defined in the distal stator face 37 of the stator device 30 (see FIG. 11).

Figure 12:
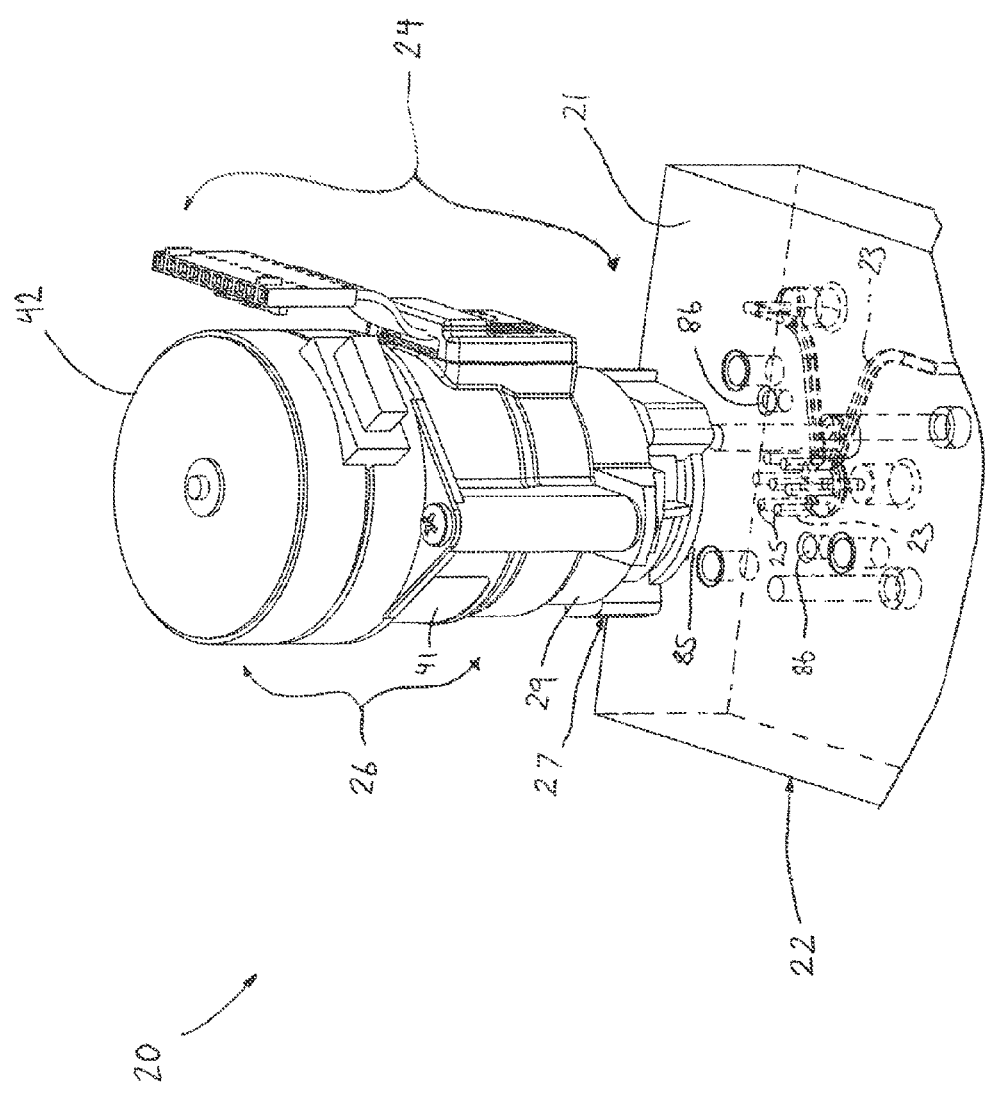
FIG. 12 is a top perspective view of the micro-fluidic valve assembly of FIG. 1, shown spaced from the manifold device.
Figure 13:
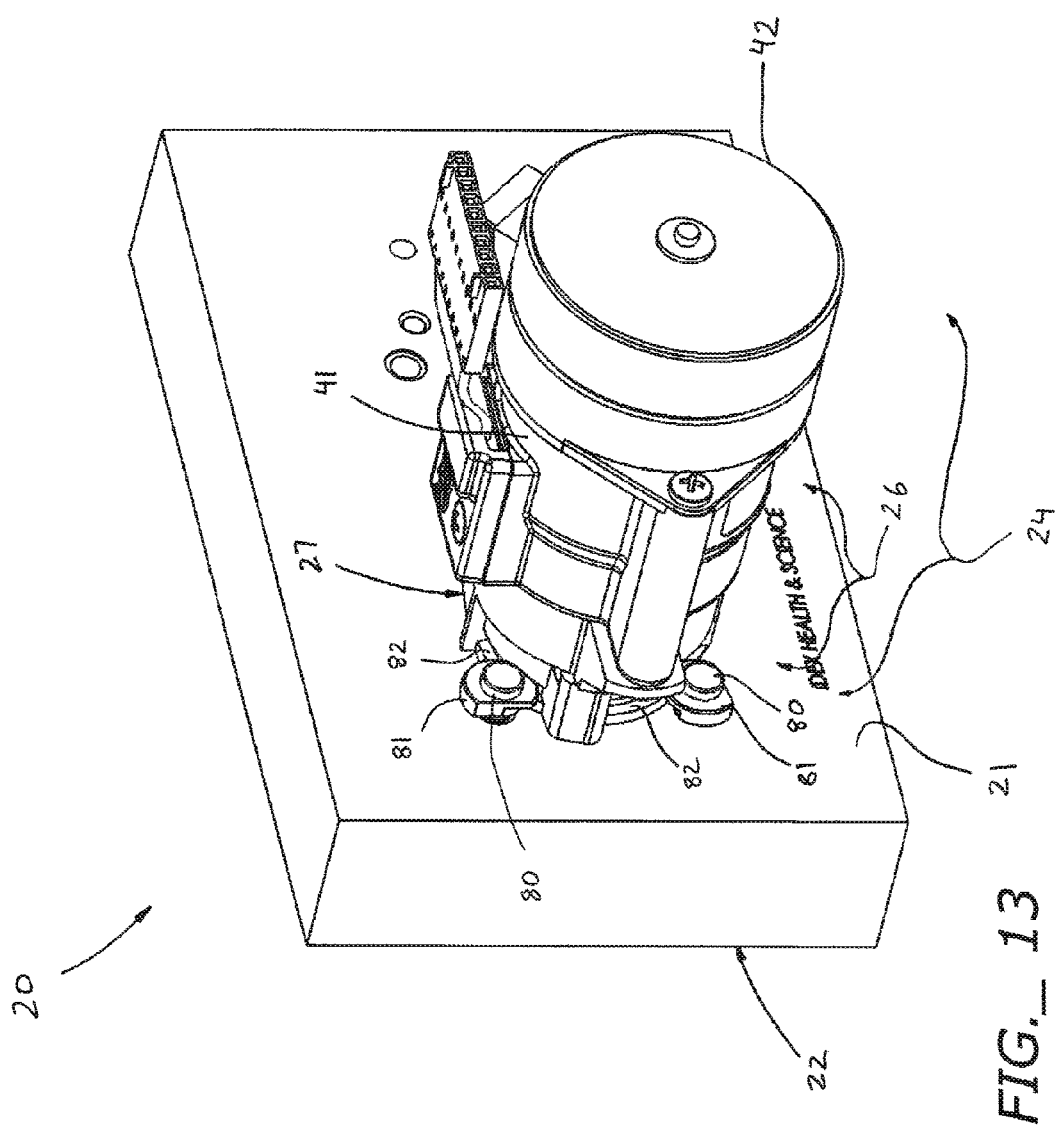
FIG. 13 is a top perspective view of the micro-fluidic valve assembly of FIG. 1, shown mounted to the manifold device.

Referring now to FIGS. 2, 12 and 13, mounting of the valve assembly 20 to the manifold device 22 is achieved by either of two techniques. The first technique relates to the application of standard fasteners 76 extending though the manifold device 22 from the distal side thereof the manifold device, and into threaded inserts 79 disposed in mounting bosses 77 formed in the injection molded POD housing 29 (FIG. 2).

The second technique relates to the application of mounting cleats 80, with a cam-like head 81, mounted to the manifold device 22 (FIGS. 12 and 13). These cam-like heads 81 are formed and dimensioned to engage an annular shoulder 82 of a distal flange 83 of the injection molded POD housing 29 as the fastener is rotated and/or threaded into the manifold device on the back side of the assembly.

To align the POD apparatus 27 relative to the manifold device 22 during assembly, two molded-in alignment posts 85 are included which are inserted into corresponding alignment holes 86 (FIGS. 2 and 12) formed in the communication face 21 of the manifold device 22. In one configuration, these corresponding keyed structures are disposed at irregular positions (i.e., different than 180 degrees apart) to ensure correct assembly and accurate alignment of holes from the stator device to gasket to manifold device.

Although the present invention has been primarily described as applying to shear face valve assemblies for high pressure applications that require high lifecycle capabilities (e.g., such as all HPLC Instrument platforms/designs), it will be appreciated that this technology may be applied to all shear valve assembly platforms/designs (such as AI (analytical chemistry) and IVD (In-vitro Diagnostics)).

What is claimed is:

1. A direct mount micro-fluidic valve apparatus configured to operably mount a micro-fluidic valve assembly, having a drive assembly, directly to a communication face of a fluid distribution manifold, in a fluid-tight manner, said fluid distribution manifold defining a plurality of fluid distribution channels each having a respective communication port terminating at the manifold communication face, said apparatus comprising:

a housing having a proximal portion and a distal mounting end having a substantially planar distal mounting face configured for mounting directly to and in contact against the communication face of said distribution manifold, said housing having an interior wall defining an interior central passage extending therethrough from the housing distal mounting end to the housing proximal portion, said interior wall at the distal mounting end terminating at said distal mounting face, forming an opening into said central passage such that when said housing is mounted to the fluid distribution manifold, said opening into said central passage is enclosed therebetween;

a stator device disposed entirely within said interior central passage, in a seated position, such that a distal stator face thereof is oriented substantially adjacent and proximal to the housing distal mounting face, said distal stator face, the interior wall at the housing opening and the manifold communication face collectively defining a gasket receptacle, containing said distal stator face therein when said stator device is oriented in the seated position, said stator device further defining a plurality of stator passages terminating at respective communication ports at said distal stator face; and a relatively thin, one-piece elastomeric gasket member having a proximal gasket face and an opposed distal gasket face, said gasket member being configured for disposition in the gasket receptacle of the housing in abutting contact between said proximal gasket face and said distal stator face, said gasket member further defining a plurality of independent through-holes, each strategically positioned such that when the housing is securely mounted to said distribution manifold, said distal gasket face contacts the manifold communication face, in a compressed condition, to form a fluid-tight seal between each respective stator communication port and a corresponding manifold communication port.

2. The micro-fluidic valve apparatus according to claim 1, wherein when said stator device is oriented in the seated position, and said gasket member is the disposed in the gasket receptacle in an uncompressed condition, said distal gasket face extends distally beyond from the housing mounting end by a distance in the range of about 0.2 mm to about 0.3 mm.

3. The micro-fluidic valve apparatus according to claim 2, wherein each gasket member through-hole includes, on at least one of the proximal stator face and the distal stator face, a molded-in O-ring seal surface circumferentially upstanding respectfully therefrom, and surrounding each through-hole thereof.

4. The micro-fluidic valve apparatus according to claim 3, wherein
a height of each O-ring seal surface is in the range of about 0.1 mm to about 0.2 mm.

5. The micro-fluidic valve apparatus according to claim 3, wherein
a diameter of each gasket through-hole is sized slightly larger than that of each corresponding stator communication port, in the uncompressed condition, such that, in the compressed condition, the diameter of each gasket through-hole is sized substantially the same as that of the corresponding stator communication port when the housing is mounted to the distribution manifold.

6. The micro-fluidic valve apparatus according to claim 2, wherein
said gasket member includes Shore A hardness in the range of about 45 to about 85 durometer.

7. The micro-fluidic valve apparatus according to claim 2, wherein
said proximal gasket face includes at least one mounting pin extending proximally, and configured for aligned sliding receipt in a corresponding alignment hole defined in the distal stator face.

8. The micro-fluidic valve apparatus according to claim 1, wherein
said interior wall of said housing includes a seat flange extending axially inward proximal said distal mounting end, and
said stator device includes an outer circumferential flange configured to cooperate with the housing seat flange to facilitate orientation of said stator device in the seated position.

9. The micro-fluidic valve apparatus according to claim 1, further including:
a rotor element disposed in the housing central passage for rotation about a rotational axis thereof, said rotor element defining a distal rotor face disposed opposite and in abutting contact with said proximal stator face, at a rotor-stator interface; and
a shaft adapter having a distal portion formed for engaged contact with said rotor element, and a proximal portion configured to rotatably engage the drive assembly of the valve assembly for selective relative rotation between the distal rotor face and the proximal stator face.

10. The micro-fluidic valve apparatus according to claim 9, further including:
a pressure adjustment assembly cooperating between drive assembly and the shaft adapter to generate an axial compression pressure between the distal rotor face and the proximal stator face, at a rotor-stator interface, to enable fluid-tight relative rotation therebetween.

11. The micro-fluidic valve apparatus according to claim 10, wherein
said pressure adjustment assembly includes a compression spring having a distal portion cooperating with the shaft adapter, and a proximal portion cooperating with the drive assembly.

12. The micro-fluidic valve apparatus according to claim 9, wherein
a distal adapter face of said shaft adapter is configured to seat against a proximal rotor face of the rotor element, the distal adapter face including two or more alignment posts extending distally thereof, and configured for aligned sliding receipt in corresponding alignment recesses defined in the proximal rotor face.

13. The micro-fluidic valve apparatus according to claim 9, further including:
a cap retainer configured to engage the interior wall of said housing, in an engaged position, releaseably retaining the stator device in the seated condition.

14. The micro-fluidic valve apparatus according to claim 13, wherein,
said shaft adapter is generally cylindrical shaped, having a first diameter, and a distal annular flange portion having a second diameter that is greater than said first diameter;
said cap retainer includes an annular ring body that defines a central through-passage having a retainer diameter sized to permit rotatably receipt of said shaft adapter, having said first diameter, and prevent axial passage of the annular distal flange portion of the shaft adapter therethrough, having said second diameter, to loosely retain the rotor element against said stator device when said shaft adapter is not in engaging contact with the drive assembly of the micro-fluidic valve assembly.

15. The micro-fluidic valve apparatus according to claim 14, wherein,
said cap retainer includes a plurality of retaining legs spaced radially about, and depending distally from, said ring body, said retaining legs being configured to radially extend around both said annular distal flange portion of said shaft adapter and said rotor element to permit selective relative rotation thereof about the rotation axis, the distal ends of said retaining legs sized and dimensioned for abutting contact against the proximal stator face to retain the stator device in the seated condition.

16. The micro-fluidic valve apparatus according to claim 15, wherein,
said cap retainer includes a plurality of snap hooks spaced radially about, and depending distally from, said ring body, said snap hooks being configured to radially extend around both said annular distal flange portion of said shaft adapter and said rotor element, and configured for locking receipt in corresponding receiving windows strategically located, and defined by the interior wall of said housing, in the engaged position.

17. A micro-fluidic valve assembly operably mounted between a drive motor and a fluid distribution manifold, said fluid distribution manifold defining a plurality of fluid distribution channels each having a respective communication port terminating at a manifold communication face, said valve assembly comprising:
an assembly housing having a proximal portion and a distal mounting end having a substantially planar distal mounting face configured for mounting directly to and in contact against the communication face of said distribution manifold, said assembly housing having an interior wall defining an interior central passage extending therethrough from the housing distal mounting end to the housing proximal portion thereof, said interior wall at the distal mounting end terminating at said distal mounting face, forming an opening into said central passage such that when said housing is mounted to the fluid distribution manifold, said opening into said central passage is enclosed therebetween;
a drive assembly rotatably positioned within said central passage proximate to said housing proximal portion, said drive assembly being rotatably coupled to the drive motor;
a rotor element having a distal rotor face, said rotor element being rotatably coupled to said drive assembly for selective rotation about a rotational axis thereof between a plurality of discrete fluid distribution positions;

a stator device disposed entirely within said interior central passage, in a seated position, such that a distal stator face thereof is oriented substantially adjacent and proximal to the distal mounting end of the assembly housing, said distal stator face, the interior wall at the housing opening and the manifold communication face collectively defining a gasket receptacle, containing said distal stator face therein when said stator device is oriented in the seated position, said stator device further defining a plurality of stator passages terminating at respective communication ports at said distal stator face; and a relatively thin, one-piece elastomeric gasket member having a proximal gasket face and an opposed distal gasket face, said gasket member being configured for disposition in the gasket receptacle of the housing in abutting contact between said proximal gasket face and said distal stator face, said gasket member further defining a plurality of independent through-holes, each strategically positioned such that when the assembly housing is securely mounted to said distribution manifold, said distal gasket face contacts the manifold communication face, in a compressed condition, to form a fluid-tight seal between each respective stator communication port and a corresponding manifold communication port.

18. The micro-fluidic valve assembly according to claim 17, wherein
when said stator device is oriented in the seated position, and said gasket member is the disposed in the gasket receptacle in an uncompressed condition, said distal gasket face extends distally beyond from the housing mounting end by a distance in the range of about 0.2 mm to about 0.3 mm.

19. The micro-fluidic valve assembly according to claim 18, wherein
said gasket member includes Shore A hardness in the range of about 45 to about 85 durometer.

20. The micro-fluidic valve assembly according to claim 17, wherein
each gasket member through-hole includes, on at least one of the proximal stator face and the distal stator face, a molded-in O-ring seal surface circumferentially upstanding respectfully therefrom, and surrounding each through-hole thereof.

21. The micro-fluidic valve assembly according to claim 17, wherein
said interior wall of said assembly housing includes a seat flange extending axially inward proximal said distal mounting end, and
said stator device includes an outer circumferential flange configured to cooperate with the housing seat flange to facilitate orientation of said stator device in the seated position.

22. The micro-fluidic valve assembly according to claim 17, further including:
a shaft adapter having a distal portion formed for engaged contact with said rotor element, and a proximal portion configured to rotatably engage a valve shaft of the drive assembly for selective relative rotation between the distal rotor face and the proximal stator face.

23. The micro-fluidic valve assembly according to claim 22, further including:
a pressure adjustment assembly cooperating between the valve shaft and the shaft adapter to generate an axial compression pressure between the distal rotor face and the proximal stator face, at a rotor-stator interface, to enable fluid-tight relative rotation therebetween.

24. The micro-fluidic valve assembly according to claim 23, wherein
said pressure adjustment assembly includes a compression spring having a distal portion cooperating with the shaft adapter, and a distal portion cooperating with the valve shaft.

25. The micro-fluidic valve assembly according to claim 23, wherein
said valve shaft defines a distal receptacle formed and dimensioned for snug, sliding axial receipt of the proximal portion of the shaft adapter therein.

26. The micro-fluidic valve assembly according to claim 23, wherein
the proximal portion of said shaft adapter defines a spring receptacle, having a distal interior wall, and
said pressure adjustment assembly includes a compression spring disposed in both said distal receptacle of the valve shaft and said spring receptacle of the shaft adapter when said shaft adapter is slideably received, axially, in the valve shaft distal receptacle, such that said rotor element is biased toward said proximal stator face for fluid-tight contact therebetween at the rotor-stator interface.

27. The micro-fluidic valve assembly according to claim 22, further including:
a cap retainer configured to engage the interior wall of said assembly housing, in an engaged position, releaseably retaining the stator device in the seated condition.

28. The micro-fluidic valve assembly according to claim 27, wherein,
said shaft adapter is generally cylindrical shaped, having a first diameter, and a distal annular flange portion having a second diameter that is greater than said first diameter;
said cap retainer includes an annular ring body that defines a central through-passage having a retainer diameter sized to permit rotatably receipt of said shaft adapter, having said first diameter, and prevent axial passage of the annular distal flange portion of the shaft adapter therethrough, having said second diameter, to loosely retain the rotor element against said stator device when said shaft adapter is not in engaging contact with the valve shaft of the drive assembly.

29. The micro-fluidic valve assembly according to claim 28, wherein,
said cap retainer includes a plurality of retaining legs spaced radially about, and depending distally from, said ring body, said retaining legs being configured to radially extend around both said annular distal flange portion of said shaft adapter and said rotor element to permit selective relative rotation thereof about the rotation axis, the distal ends of said retaining legs sized and dimensioned for abutting contact against the proximal stator face to retain the stator device in the seated condition.

30. A micro-fluidic valve system comprising:
a micro-fluidic valve actuator apparatus having an actuator housing and a drive assembly;
a fluid distribution manifold having a communication face and a plurality of fluid distribution channels each having a respective communication port terminating at the manifold communication face; and
a direct mount micro-fluidic valve apparatus including:
a direct mount housing having a proximal portion and a distal mounting end having a substantially planar distal mounting face configured for mounting directly to and in contact against the communication face of said distribution manifold, said direct mount housing further including an interior wall defining an interior central passage extending therethrough from the housing distal mounting end to the housing proximal portion, said interior wall at the distal mounting end terminating at said distal mounting face, forming an opening into said central passage such that when said housing is mounted to the fluid distribution manifold, said opening into said central passage is enclosed therebetween;

a stator device disposed entirely within said interior central passage, in a seated position, such that a distal stator face thereof is oriented substantially adjacent and proximal to the housing distal mounting face, said distal stator face, the interior wall at the housing opening and the manifold communication face collectively defining a gasket receptacle, containing said distal stator face therein when said stator device is oriented in the seated position, said stator device further defining a plurality of stator passages terminating at respective communication ports at said distal stator face; and a relatively thin, one-piece elastomeric gasket member having a proximal gasket face and an opposed distal gasket face, said gasket member being configured for disposition in the gasket receptacle of the housing in abutting contact between said proximal gasket face and said distal stator face, said gasket member further defining a plurality of independent through-holes, each strategically positioned such that when the housing is securely mounted to said distribution manifold, said distal gasket face contacts the manifold communication face, in a compressed condition, to form a fluid-tight seal between each respective stator communication port and a corresponding manifold communication port.

* * * * *